United States Patent [19]

Takeuchi

[11] Patent Number: 4,922,100

[45] Date of Patent: May 1, 1990

[54] METHOD FOR READING A RADIOGRAPHIC IMAGE

[75] Inventor: Mikio Takeuchi, Hino, Japan

[73] Assignee: Konishiroku Photo Industry Co., Ltd., Tokyo, Japan

[21] Appl. No.: 371,682

[22] Filed: Jun. 19, 1989

Related U.S. Application Data

[63] Continuation of Ser. No. 838,310, Mar. 10, 1986, abandoned.

[30] Foreign Application Priority Data

Mar. 13, 1985 [JP] Japan .................................. 60-51140
Apr. 24, 1985 [JP] Japan .................................. 60-89165

[51] Int. Cl.$^5$ ............................................. G03B 42/00
[52] U.S. Cl. .............................. 250/327.2; 250/484.1; 364/413.13
[58] Field of Search .................... 250/327.2, 327.2 D, 250/327.2 E, 327.2 F, 327.2 G, 484.1 B; 364/413.13

[56] References Cited

U.S. PATENT DOCUMENTS

Re. 31,847  3/1985  Luckey ........................... 250/327.2
4,498,006  2/1985  Horikawa et al. ............... 250/327.2

FOREIGN PATENT DOCUMENTS 0021342  1/1981  European Pat. Off. ......... 250/484.1

Primary Examiner—Constantine Hannaher
Attorney, Agent, or Firm—Jordan B. Bierman

[57] ABSTRACT

In a method of reading a image information stored in a radiographic image-converting panel having a stimulable phosphor layer thereon, the improvement of present invention includes a step of rectification against a light decay which occur continuously in the phosphor layer with the lapse of time subsequent to image-wise exposure.

The rectification enables to get a precise image information having no shading caused by the light decay.

26 Claims, 9 Drawing Sheets

FIG. 5
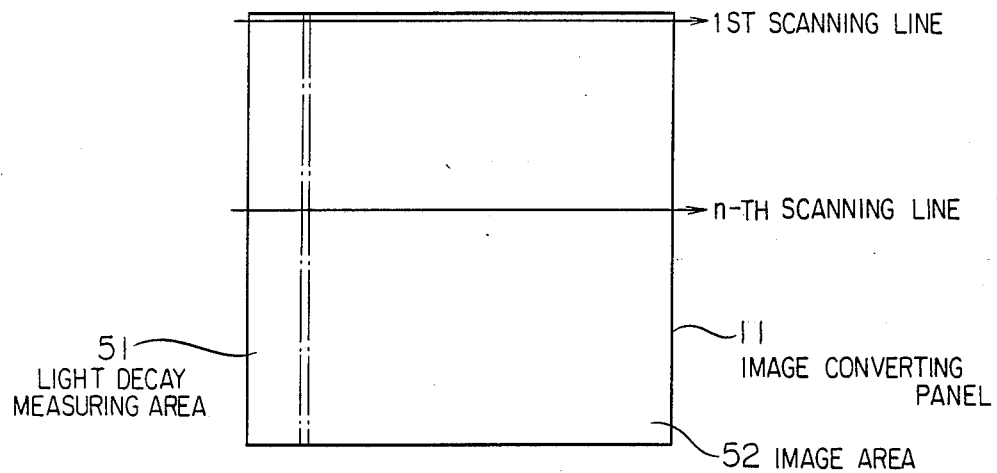
i) 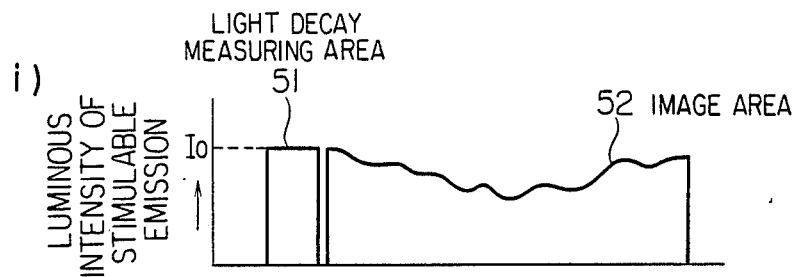
ii) 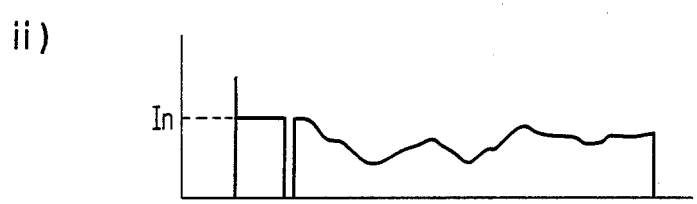

METHOD FOR READING A RADIOGRAPHIC IMAGE

This application is a continuation, of application Ser. No. 838,310, filed Mar. 10, 1986, now abandoned.

BACKGROUND OF THE INVENTION

The present invention relates to a method for reading a radiographic image wherein an image-wise exposure is given by means of a radiation to a radiographic image-converting panel (hereinafter referred to as an image-converting panel) having a stimulable phosphor layer and then the surface of the image converting-panel is scanned by stimulating light to produce a stimulable emission and thereby an image information recorded is read.

When a stimulable phosphor is exposed to a radiation such as X-rays, ultraviolet rays, a part of their energy is stored in the stimulable phosphor corresponding to the amount of exposure and if such stored energy is irradiated by stimulating light, the stored energy is emitted as stimulable light emission corresponding to the exposure. Such phenomenon is used for recording images formed by various kinds of radiations. As an example Japanese Patent Publication Open to Public Inspection No. 12144/1980 (hereinafter referred to as Japanese Patent O.P.I. Publication) discloses a method wherein a image-converting panel having a stimulable phosphor layer is given an image-wise exposure by means of a radiation such as X-rays to absorb a radiation energy for forming a kind of latent image thereon, and then the surface of the image-converting panel is scanned by the beam of stimulating light and thereby the intensity of the stimulable emission emitted from a phosphor is read and thus a radiation image is obtained. In such a method, a laser beam is usually used as stimulating light and a photo-detector such as a photomultiplier is used for reading a stimulable emission and the luminous intensity of the stimulable emission is picked up as an electrical signal and, finally, the electrical signal is used as image reproduction means on a hard copy or on a CRT screen.

Aforesaid image recording method has advantages such as: a range of a radiation exposure to be recorded is extremely wide: an image information obtained as an electrical signal can freely be treated by a signal processing: and, an optimum image suitable for purposes may be obtained. However, this method has a problem to be solved. That is, the energy stored in stimulable phosphor is likely to decrease to a great extent with the lapse of time.

Due to aforesaid disadvantage, as shown in FIG. 2, the read intensity of stimulable emission decreases according to the prolongation of the time elapsed after the image-wise exposure ($t_0$) by means of a radiation until scanning ($t_1$) by means of a stimulating light, whereby accurate tone reproduction of the image becomes difficult.

As measures against aforesaid disadvantages. Japanese Patent O.P.I. Publication No. 67242/1983, for example, discloses a reading apparatus wherein a preliminary reading by means of a weak stimulating light is conducted in advance of the reading of an image information and the conditions for the formal reading and image-processing are established based on the output of aforesaid preliminary reading.

However, since the decay in the intensity of a stimulable emission with the lapse of time continues even for the period from the commencement ($t_1$) of the reading to the termination ($t_2$) thereof, it is impossible to prevent an occurrence of density difference (shading) caused by the difference of density between the leading edge and the trailing edge of an image area in spite of the compensation made for the correction of the decay between aforesaid $t_0$ and $t_1$.

SUMMARY OF THE INVENTION

An object of the invention is to provide a radiographic image-recording apparatus being capable of performing the image-recording free from the shading caused by the decay in the luminous intensity of stimulable emission that takes place during the period from $t_1$ to $t_2$. Aforesaid object has been attained by a method for reading radiographic images comprising the steps of scanning by means of stimulating light the radiographic image-converting panel having thereon a stimulable phosphor layer that is given in advance an image-wise exposure by means of a radiation and of reading the luminous intensity of stimulable emission emitted after aforesaid scanning, wherein the step for rectifying the decay of the luminous intensity of stimulable emission over the period from the start of reading to the completion thereof is included.

And, FIG. 5 is a schematic diagram showing an image-converting panel provided with a measuring area for the luminous intensity of a stimulable emission and the results of scanning thereof.

DETAILED DESCRIPTION OF THE PREFERRED EMBODIMENTS

Figure 2:
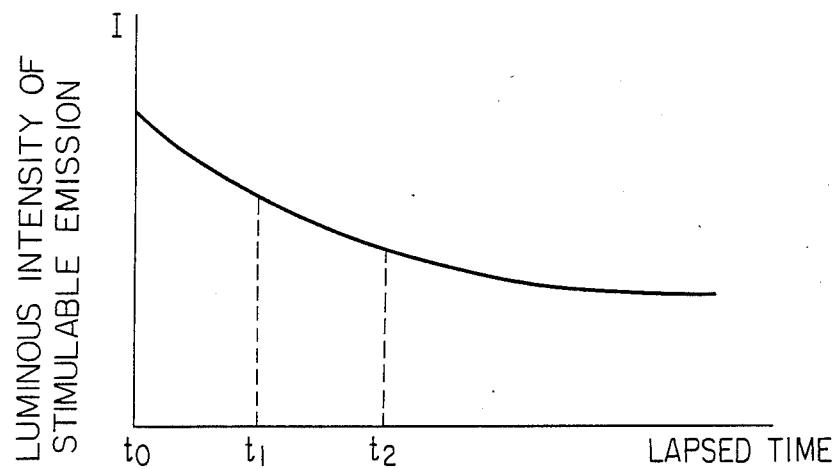
FIG. 2 and FIG. 9 respectively represent luminous intensity decay curves of the stimulable emission.

Various methods are available as a means for rectifying the decay of the luminous intensity of stimulable emission that takes place during the period from the start of reading to the completion thereof and the following two methods may be mentioned as the representative: (1) a method wherein, by the use of an image-converting panel having a predetermined characteristic in the luminous intensity decay curve of stimulable emission following the radioactive ray exposure ($t_0$) and by measuring the time from an image-wise exposure by means of a radiation to the start of reading, namely, a position of $t_1$ on an abscissa in FIG. 2, the decay of luminous intensity of stimulable emission following the start ($t_1$) of reading is predicted and the results of reading are rectified corresponding to the results of aforesaid prediction. (2) a method wherein a part of an image-converting panel is provided with an area that is given a certain amount of exposure by means of radioactive rays, the values of stimulable emission are read including aforesaid area and then the decay is detected through the value of stimulable emission of aforesaid area and thus the results of reading for the image area are rectified.

It is possible to rectify the results of reading by controlling an amplification gain in the reading system or it is also possible to rectify through the after-treatment such as multiplying a rectification coefficients after temporarily storing the read values in a memory circuit.

A stimulable phosphor used in the radiographic image-converting panel of the invention is a phosphor having the so-called stimulability; that is, a phosphor which is capable of causing light emission corresponding to the amount of initial exposure by a light or a high-energy radioactive ray through an optical, thermal, mechanical, chemical or electrical stimulation. The light in this case includes a visible ray, an ultraviolet ray and an infrared ray and the high-energy radioactive ray includes an X-ray, a gamma ray, a beta ray, an alpha ray and a neutron ray.

As such the phosphor, for example, one that emits a light having a wavelength of 300nm~500nm after receiving the stimulating light may be used. For example, a phosphor represented by the general formula $BaSO_4$:Ax described in Japanese Patent O.P.I. Publication No. 80487/1973 (wherein, A is at least one kind of Dy, Tb or Tm and x is within a range of $0.001 < x < 1$ mole %), a phosphor represented by the formula $MgSO_4$:Ax described in Japanese Patent O.P.I. Publication No. 80488/1973 (wherein, A is any one of Ho or Dy and x is within a range of $0.001 \leq x < 1$ mole %), a phosphor represented by the formula $SrSO_4$:Ax described in Japanese Patent O.P.I. Publication No. 80489/1973 (wherein, A is at least one kind of Dy, Tb or Tm and x is within a range of $0.001 \leq x < 1$ mole %), phosphors such as BeO, LiF, $MgSO_4$, $CaF_2$ and others described in Japanese Patent O.P.I. Publication No. 30487/1977, and a phosphor represented by the formula SnS:Ce,Sm, SrS:Eu,Sm, $La_2O_2S$:Eu,Sm and (Zn, Cd)S:Mn,X described in U.S. Pat. No. 3,859,527 (wherein X is halogen) may be mentioned.

Further, an alkaline earth metal silicate type phosphor represented by the general formula, $M^{II}O \cdot xSiO_2$ : A (wherein, $M^{II}$ is Mg, Ca, Sr, Zn, Cd or Ba and A is at least one kind of Ce, Tb, Eu, Tm, Pb, Tl, Bi or Mn and x is within a range of $0.5 \leq x \leq 2.5$); an alkaline earth fluorohalide phosphor represented by the general formula,

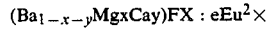
$(Ba_{1-x-y}Mg_xCa_y)FX : eEu^{2+}$ (wherein, X is at least one of Br or Cl and x, y and e are the numbers satisfying the condition of $0 < x+y \leq 0.6$, $xy \neq 0$ and $10^{-5} \leq e \leq 5 \times 10^{-2}$); a phosphor described in Japanese Patent O.P.I. Publication No. 12144/1980 and represented by the general formula.

LnOX : xA (wherein, Ln is at least one among La, Y, Gd and Lu; X is Cl and/or Br; A is Ce and/or Tb and x is the numbers satisfying the condition of $0 < x < 0.1$); a phosphor described in Japanese Patent O.P.I. Publication No. 12145/1980 and represented by the general formula,

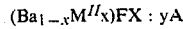
$(Ba_{1-x}M^{II}{}_x)FX : yA$ (wherein, $M^{II}$ is at least one among Mg, Ca, Sr, Zn and Cd; X is at least one among Cl, Br and I; A is at least one among Eu, Tb, Ce, Tm, Dy, Pr, He, Nd, Yb and Er and x and y are the numbers satisfying the conditions of $0 \leq x \leq 0.6$ and $0 \leq y \leq 0.2$); a phosphor described in Japanese Patent O.P.I. Publication No. 84389/1980 and represented by the general formula.

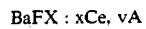
BaFX : xCe, vA (wherein, X is at least one among Cl, Br and I; A is at least one among In, Tl, Gd, Sm and Zr and x and y are the numbers satisfying the conditions of $0 < x \leq 2 \times 10^{-1}$ and $0 < y \leq 5 \times 10^{-2}$); a phosphor of divalent metal fluorohalide activated by rare earth element described in Japanese Patent O.P.I. Publication No. 160078/1980 and represented by the general formula.

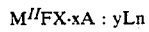
$M^{II}FX \cdot xA : yLn$ (wherein, $M^{II}$ is at least one kind among Mg, Ca, Ba, Zn and Cd; A is at least one kind among BeO, MgO, CaO, SrO, BaO, ZnO, $Al_2O_3$, $Y_2O_3$, $La_2O_3$, $In_2O_3$, $SiO_2$, $TiO_2$, $ZrO_2$, $GeO_2$, $SnO_2$, $Nb_2O_5$, $Ta_2O_5$ and $ThO_2$; Ln is at least one kind among Eu, Tb, Ce, Tm, Dy, Pr, Ho, Nd, Yb, Er, Sm and Gd and x and y are the numbers satisfying the conditions of $5 \times 10^{-5} \leq x \leq 0.5$ and $0 < y \leq 0.2$); a phosphor described in Japanese Patent O.P.I. Publication No. 148285/1982 and represented by the general formula [I] or [II],

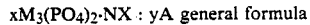
$xM_3(PO_4)_2 \cdot NX : yA$ general formula [I]

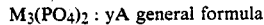
$M_3(PO_4)_2 : yA$ general formula [II]

(wherein, each of M and N is at least one kind among MG, Ca, Sr, Ba, Zn and Cd; X is at least one kind among F, Cl, Br and I, and A is at least one kind among Eu, Tb, Ca, Tm, Dy, Pr, Ho, Nd, Yb, Er, Sb, Tl, Mn and Sn and x and y are the numbers satisfying the conditions of $0 < x \leq 6$ and $0 \leq y \leq 1$) and a phosphor represented by the general formula [III] or [IV],

$nReX_3 \cdot mAX_2' : xEu$ general formula [III]

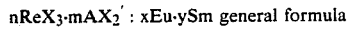
$nReX_3 \cdot mAX_2' : xEu \cdot ySm$ general formula [IV]

(wherein. Re is at least one kind among La, Gd, Y and Lu; A is at least one kind among Ba, Sr and Ca which are an alkaline earth metal, each of X and X' is at least one kind among F, Cl and Br, x and y are the numbers satisfying the condition of $1 \times 10^{-4} < x < 3 \times 10^{-1}$ and $1 \times 10^{-4} < y < 1 \times 10^{-1}$ and n/m satisfies the condition of $1 \times 10^{-3} < n/m < 7 \times 10^{-1}$) may be given. Furthermore, an alkali halide phosphor represented by the general formula [V],

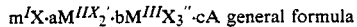
$m^IX \cdot aM^{II}X_2' \cdot bM^{III}X_3'' \cdot cA$ general formula [V]

(wherein, $M^I$ is at least one kind of alkali metal selected from the group consisting Li, Na, K, Rb and Cs; $M^{II}$ is at least one kind of divalent metal selected from the group consisting of Be, Mg, Ca, Sr, Ba, Zn, Cd, Cu and Ni, and $M^{III}$ is at least one kind of trivalent metal selected from the group consisting of Sc, Y, La, Ce, Pr, Nd, Pm, Sm, Eu, Gd, Tb, Dy, Ho, Er, Tm, Yb, Lu, Al, Ga and In: each of X, X' and X'' is at least one kind of halogen selected from the group consisting of F, Cl, Br and I, A is at least one kind of metal selected from the group consisting of Eu, Tb, Ce, Tm, Dy, Pr, Ho, Nd, Yb, Er, Gd, Lu, Sm, Y, Tl, Na, Ag, Cu and Mg: a is a number within a range of $0 \leq a < 0.5$; b is a number within a range of $0 \leq b < 0.5$, and c is a number within a range of $0<c\leqq 0.2$) and others are given and a phosphor used in the invention is not limited to the foregoings.

Figure 9:
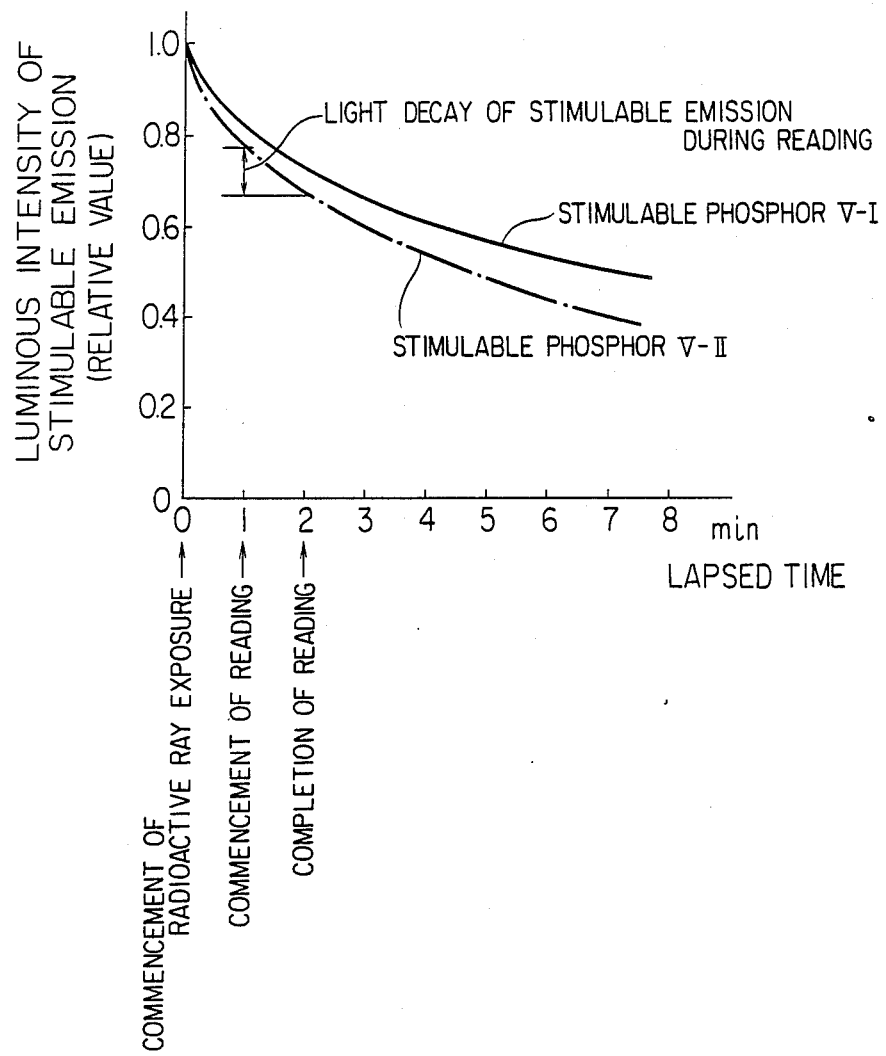

If the phosphor expressed with a general formula [V] is scanned by the stimulating light after being given an exposure of radioactive rays, the luminous intensity of stimulable emission decreases with the lapse of time after exposure as shown in FIG. 9. In FIG. 9, the phosphor V-I and the phosphor V-II are the ones selected from these represented by the formula [V] provided that the composition thereof differ from each other. If a radiographic image is read, using aforesaid phosphors and without any rectification of the invention, it is difficult to obtain an image with a good image quality due to the decay in the luminous intensity of stimulable emission that takes place over the period between the start of reading and the completion thereof. An allowable range for the fluctuation in the light emission within a reading time period is practically about ±3%, and if the fluctuation exceeds this value, the problem of shading will appear on the image picture. If the reading is started one minute after the radioactive ray exposure on the phosphor V-II in FIG. 9 and if one minute is needed for the completion of the reading, the decay for the period reaches about 10% and exceeds considerably aforesaid range, which causes a practical problem.

The invention has been devised from the aforesaid viewpoint and it becomes possible to solve aforesaid problems by using the method of the invention and thereby to obtain a radiographic image with a good quality.

As the stimulating light to be used for causing these stimulable phosphors to emit stimulable emission, a visible light, an infrared light or the like may be used and it is effective to use the light with a wavelength from 500nm to 2000nm and most preferably He-Ne laser, Ar laser, YAG laser, He-Cd laser, Kr laser, dye laser, semiconductor laser may be mentioned. Further, an illuminant that emits over the broader band may be used after being converted to the light with a wavelength from 500nm to 2000nm through a filter.

As a support for the radiographic image-converting panel used in the invention, anyone widely-known may be used. For example, paper, a metal plate and a plastic plate such as a polyethylene sheet, a plastic film and an aluminum plate each having 50μm to 300μm thickness and a glass plate having 1mm to 3mm thickness may be mentioned. A more detailed explanation of the invention will be made hereinbelow referring to the examples.

EXAMPLES

Figure 1:
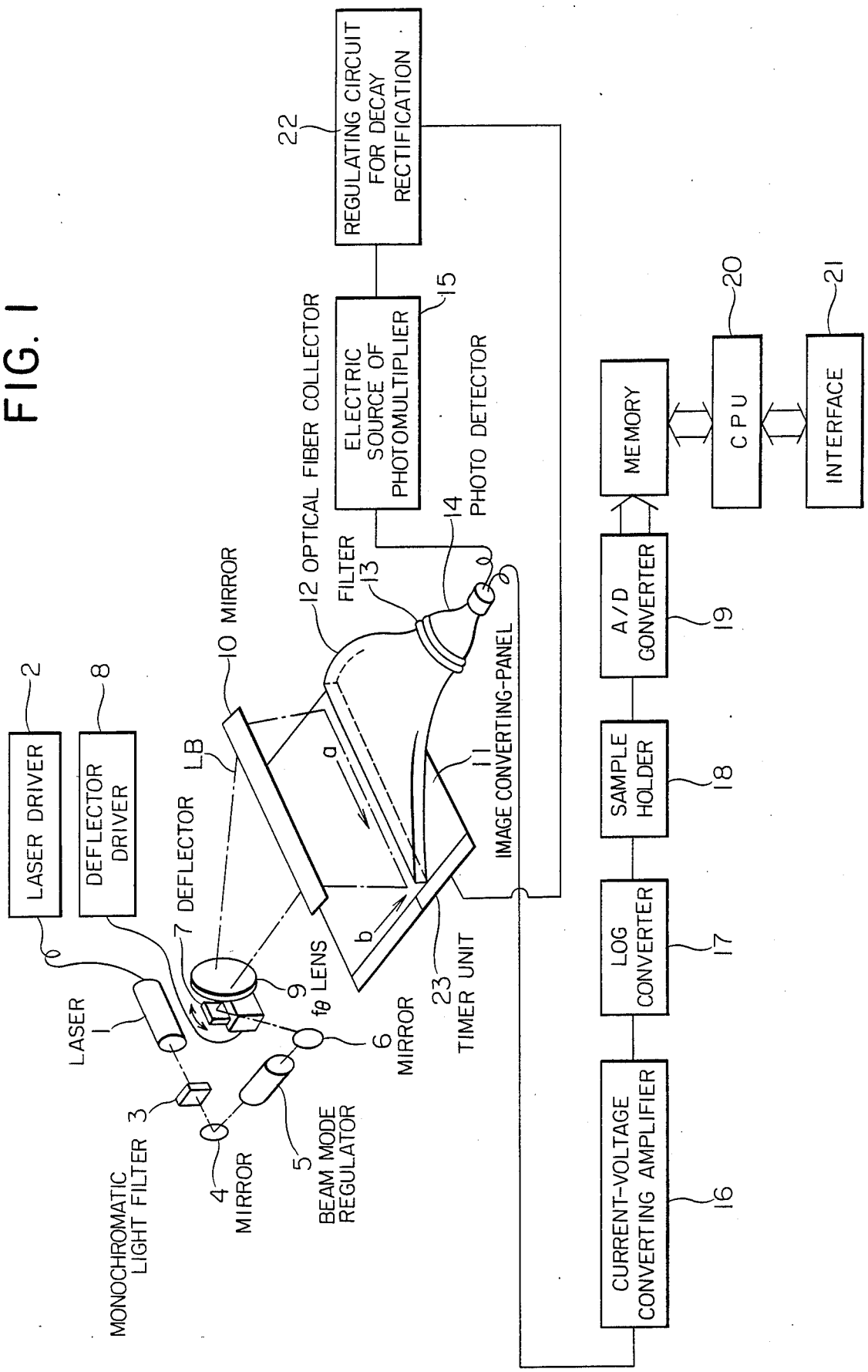
FIG. 1 and FIG. 6 respectively represent block diagrams of a radiographic image-reading apparatus suitable for performing the method of the invention.

FIG. 1 is a block diagram showing an example of a radiographic imae-reading apparatus suitable for performing the method of the invention. In the diagram, the numeral 1 is a laser for generating the stimulating light and it is driven by a laser driver circuit 2. The laser beam LB emitted from the laser 1 reaches the deflector 7 through monochromatic light filter 3, mirror 4, beam mode regulator (anamorphic beam expander) 5 and mirror 6. The deflector 7 is provided with a galvano mirror driven by a deflector driver and deflects the laser beam LB within a scanning area at a predetermined angular velocity. The deflected laser beam LB scans, in the direction of an arrow a, a radiographic image-converting panel 11 having thereon a phosphor expressed with aforesaid general formula [V] through a mirror 10 adjusted by f0 lens 9 to give a predetermined speed on the scanning line. The image-converting panel 11 moves concurrently in the sub-scanning direction (arrow b) for the scanning over the entire plane. The stimulable emission emitted from image-converting panel 11 after the scanning by laser beam LB is collected by optical fiber collector 12 and reaches the photo-detector 14 provided with a photoelectric converter such as a photomultiplier through a filter 13, which transmits only a wavelength range for the stimulable emission and then is converted to analog electrical signals. The numeral 15 is a electric source (poWer source) that supplies a high voltage to the photomultiplier. Image signals generated as an electric current from the photomultiplier pass through the current-voltage converting amplifier 16 and are amplified in voltage and further pass through Log converter 17 that converts the signals of luminous intensity of stimulable emission into image density signals and through sample holder circuit 18 that hold a signal for predetermined period sinchronizing with clock signal for image information and then are converted into digital signals by A/D converter 19 and are finally stored in a memory. The memory is connected to CPU 20 that executes digital operations. The CPU 20 may be connected, through interface 21, to external equipments such as, for example, a large-scale computer that stores or processes data, a minicomputer, a CRT display device that create image picture and various types of hard copy-producing apparatuses and executes operation and transfer of the data stored in the memory.

The numeral 22 is a decay-rectification control circuit for rectifying the decay of the luminous intensity of stimulable emission for the period from the start to the completion of the reading of stimulable emission and it transfers the control signals corresponding to the signals from the rectification value-detecting means described later to the predetermined block in aforesaid reading system and rectifies the signals which have been read. Various blocks in aforesaid reading system can rectify the signals which are read. Examples thereof are shown below.

laser:output adjustment by controlling laser driver 2
scanning section:beam scanning speed adjustment by controlling deflector driver 8
photo detector:photo-electric conversion gain adjustment by controlling the power source 15 for photomultiplier
current-voltage converting amplifier: control of amplification gain
Log converter:control of conversion gain
sample holder:control of internal gain
A/D converter:control of A/D conversion dynamic range It is also possible to input the rectification signals in the CPU 20 and carry out a rectification operation of the data stored in the memory and then put them in the memory again and cause them to be generated on the interface. The control for the rectification may be made either on one of aforesaid processing steps or on plural steps thereof in parallel. The output mode of the regulating circuit for decay rectification may be one corresponding to the step where the control is made.

When rectifying the read value based on the period from the radioactive ray exposure to the image-converting panel to the start of reading, the rectification may be made in a way wherein a memory device is provided in the decay rectification regulating-circuit, and the relation (see FIG. 2) measured in advance between the luminous intensity of stimulable emission and the lapsed time is inputted into the memory device in advance and then the luminous intensity of stimulable emission $I(t_1)$ at the start of scanning $t_1$ and the luminous intensity of stimulable emission $I(tn)$ corresponding to the scanning time $(tn)$ of the scanning lines to be rectified are called from the memory device according to the input of the lapsed time until the start of reading being transmitted from the time-detecting means and thereby $I(t_1)/I(tn)$ is computed in the operation section and the output of the results of aforesaid computation is transferred to the reading system and then the reading gain is controlled, or the rectification is made on the data stored temporarily in the reading memory.

As a time-detecting means, various kinds of known timer units of an electronic type or of a mechanical type may be used. These time-detecting means may be used in many ways including following modes as an example:

(1) The time-detecting means is to be provided on the side of a radioactive ray exposure apparatus and is actuated interlocking with the switch for radioactive ray exposure to display the lapsed time and when reading, an operator reads the displayed value and inputs it manually in the regulating circuit for decay rectification.

(2) The time-detecting means is to be provided either on a radioactive ray exposure apparatus or on a reading apparatus and is connected electrically to both apparatuses to be actuated interlocking with the switch for radioactive ray exposure, thereby to measure the lapsed time, to read $t_1$ and to automatically input them in the decay rectification regulating circuit at a time of the start.

(3) The time-detecting means is attached to an image-converting panel. When the image-converting panel is mounted on a radioactive ray exposure apparatus, the time-detecting means is connected to the apparatus and is actuated interlocking with the switch for exposure. When the image-converting panel is mounted on the reading apparatus for reading, the time detecting means is connected to the reading apparatus, and thus the lapsed time is inputted in the decay rectification regulating circuit concurrently with the start of reading.

An example shown in FIG. 1 is the one wherein the mode of aforesaid (3) is used and the control of the gain of the electric source 15 for photomultiplier is made and thus the decay rectification for the stimulating light of an image-converting panel is made. In the drawing, 23 is a timer unit provided on the image-converting panel.

Figure 3:
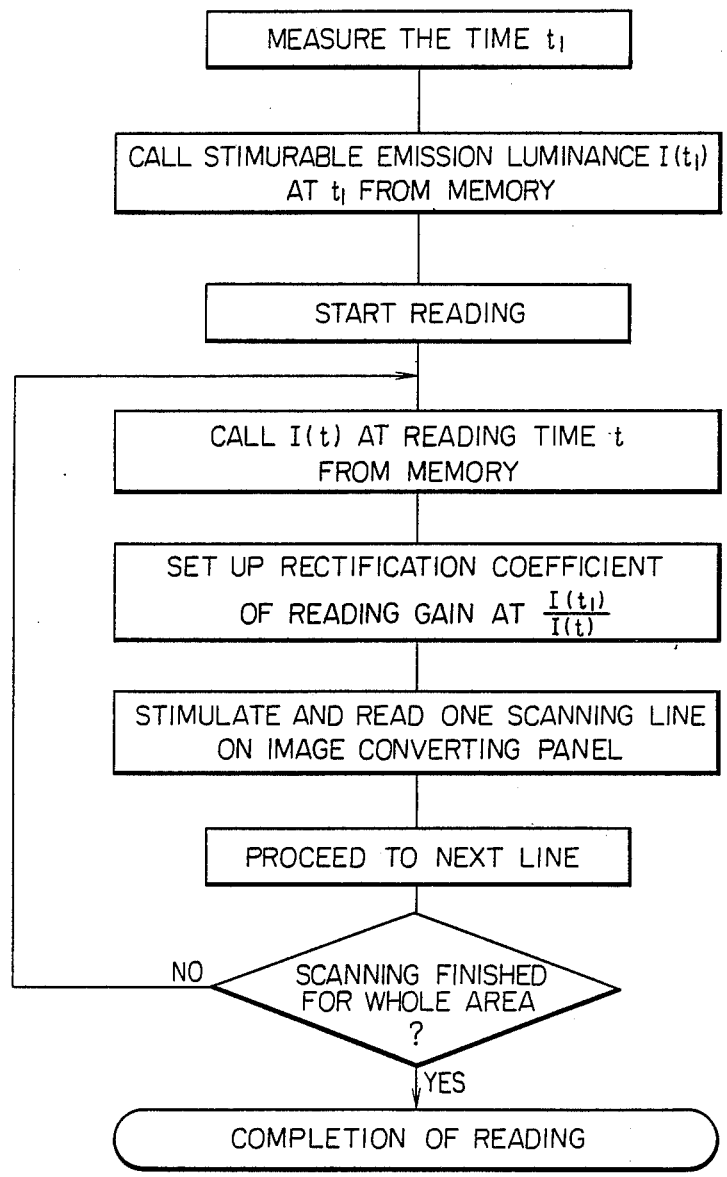
FIG. 3, FIG. 4, FIG. 7 and FIG. 8 respectively represent a flow chart showing the procedure of image-reading and a rectification based on the method of the invention.

FIG. 3 is a flow chart showing the actions of decay rectification for the stimulating light in the aforesaid apparatus.

Figure 4:
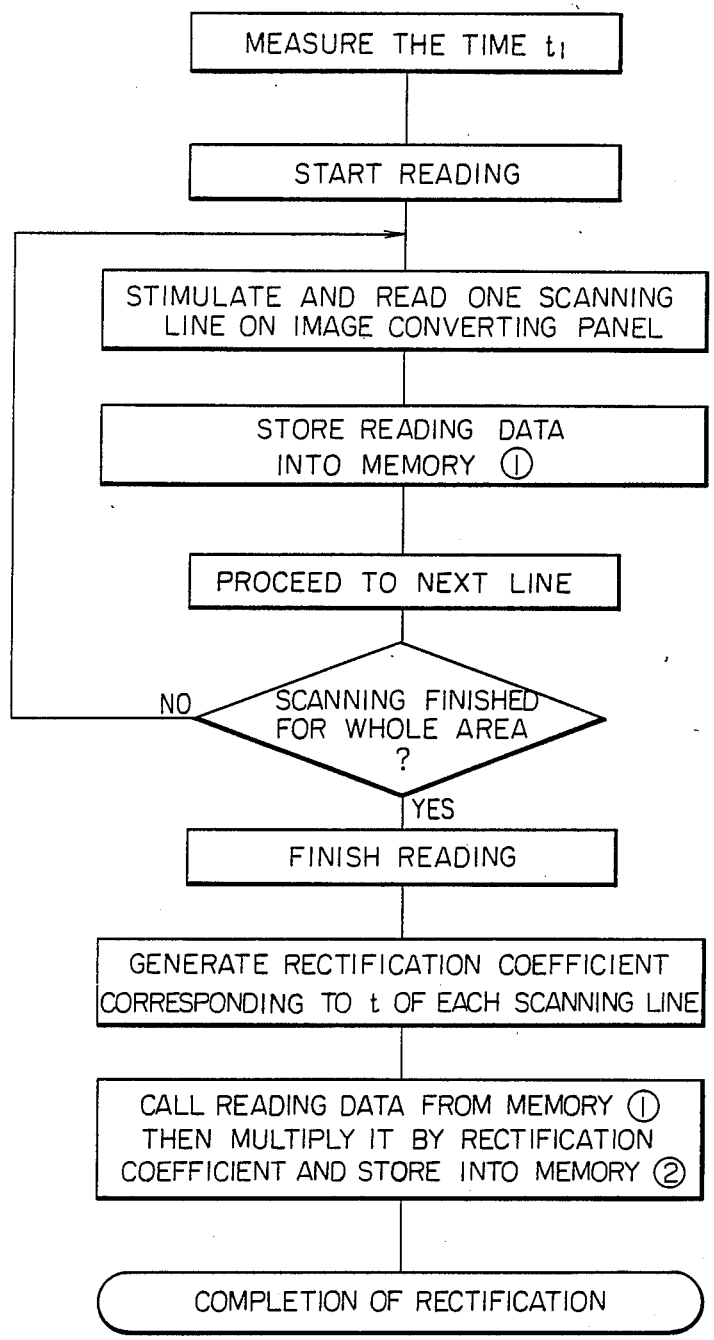

FIG. 4 shows a procedure wherein the data read are stored temporarily in memory (1) without being processed and then the rectification coefficient corresponding to t for each line is generated from the decay rectification circuit and after that the data are called from the memory (1) to the CPU wherein the rectification coefficient and the data are multiplied together for the rectification.

Further, when rectification is carried out through actual measurement of stimulable emission, as shown in FIG. 5 the measuring area 51 for the luminous intensity of stimulable emission, where predetermined amount of uniform radioactive rays are irradiated when an imagewise radioactive ray exposure is given in the image area, is provided adjacent to the image area 52 of the image-converting panel, and aforesaid measuring area is also to be scanned for reading. Though the luminous intensity of stimulable emission on aforesaid measuring area decays during the reading, the decay of the luminous intensity of stimulable emission during the period from the start of reading to the completion thereof may be rectified if the gain of the reading system is controlled so that the values read are always identical to the one at the start of reading, or if the value read is multiplied by the rectification coefficient.

The curves of i) and ii) in FIG. 5 show typically the luminous intensity of stimulable emission Io at the start of the reading and that In obtained by n-th scanning respectively and the value read by the n-th reading on the image area is to be subjected to the rectification Io/In of the gain in reading, or the data after the reading are to be multiplied by the rectification coefficient.

Figure 6:
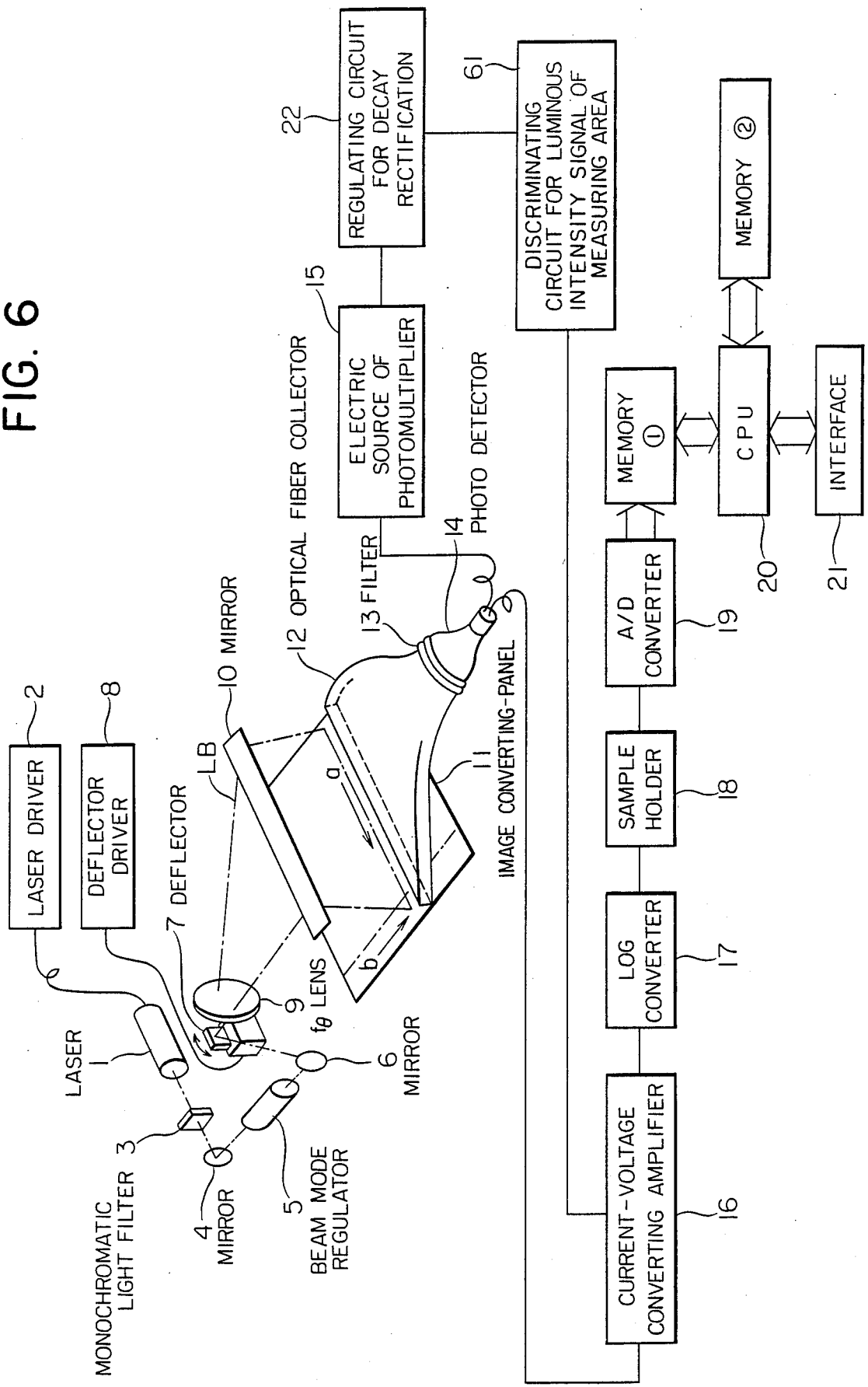
Figure 7:
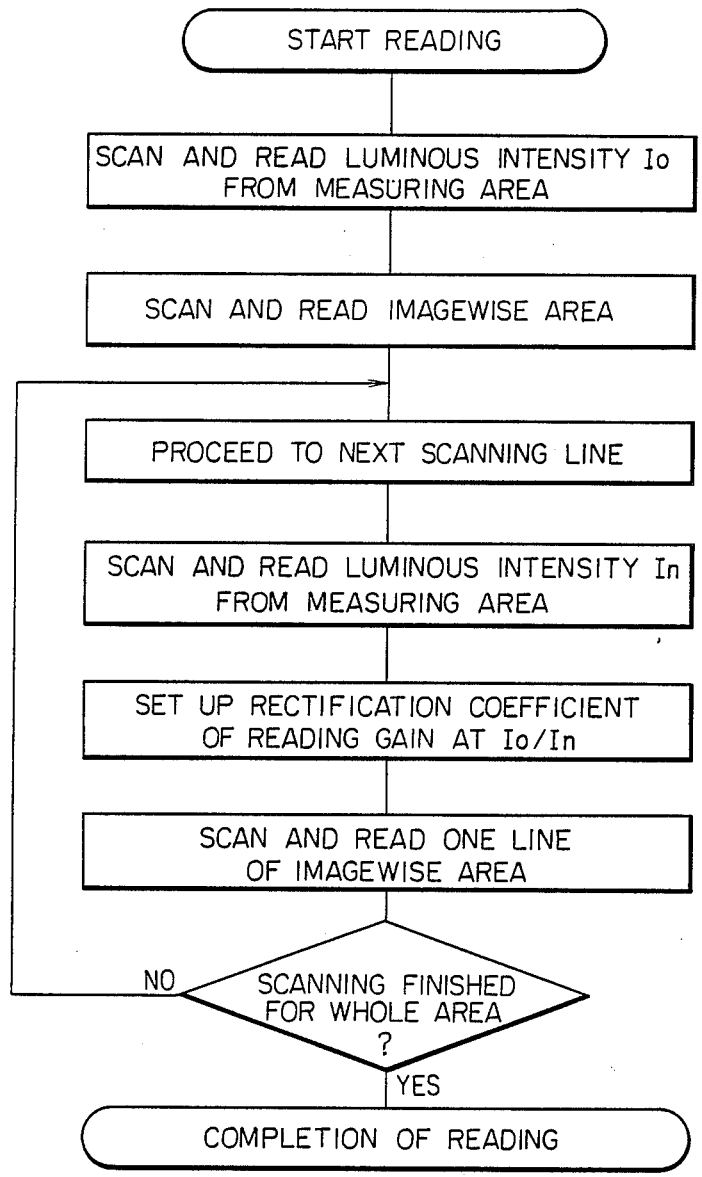

FIG. 6 is an example of the reading apparatus suitable for carrying out aforesaid method, wherein the signal of the measuring area is separated from the signal read by the photodetector 13 by discriminating circuit for luminous intensity signal of measuring area and is inputted in the decay rectification regulating circuit 61. Thus, the reading system is controlled after the calculation of Io/In.

Even in this case, the rectification control of the value read may also be made at each step of the reading apparatus.

Figure 8:
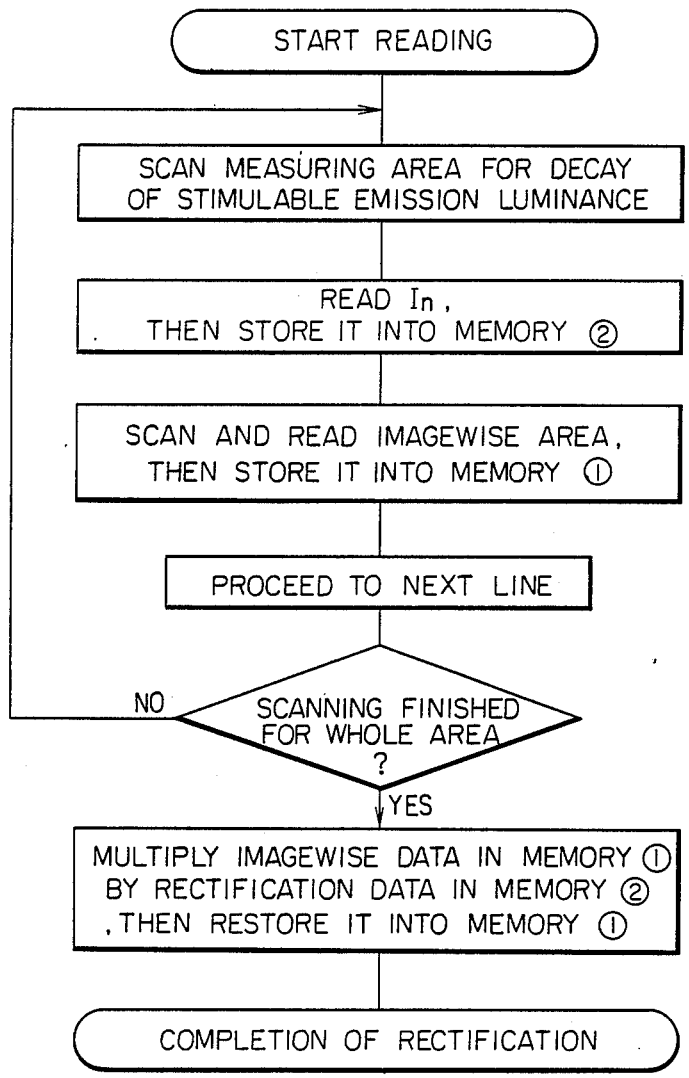

FIG. 8 is a flow chart wherein the reading is made without any rectification and the values read are stored temporarily in the memory and then the rectification calculation is made.

As stated above, according to the present invention, it has become possible to rectify completely the decay in the luminous intensity of stimulatable phosphor with the passage of time during the period from the start of image-reading to the completion thereof and to read the precise image information without the influence of shading.

It is, as a matter of course, possible that the method of the invention is executed in parallel with other rectification such as, for example, a rectifying process of the luminous intensity of stimulable emission during the period from the radioactive ray exposure (FIG. 2 to) to the start of reading $(t_1)$.

I claim:

1. A method of reading radiographic image information from the phosphor layer of a radiographic image converting panel wherein said phosphor layer, upon imagewise exposure with a radioactive ray, stores a radiographic image thereon and upon receiving a stimulating light causes a light emission corresponding to said stored radiographic image to be emitted therefrom, said method comprising:

scanning said phosphor layer with a stimulating light on a line by line basis to generate said light emission, photoelectrically converting said light emission into an image signal, calculating the lapsed time between imagewise exposing and scanning on line by line basis, reading from a memory the light decay characteristics of the phosphor layer predetermined with respect to the lapsed time between imagewise exposing and scanning on a line by line basis, calculating a correction factor for each scanned line, each said correction factor being calculated based upon the time lapse between imagewise exposure and scanning of the corresponding line and the read light decay characteristic, and rectifying the image signal for each scanned line using said corresponding correction factor to compensate for the light decay thereof.

2. A radiation image read-out method for scanning a stimulable phosphor sheet, having a radiation image stored thereon by imagewise exposure, with stimulating rays which cause the stimulable phosphor sheet to emit light in proportion to stored radiation energy, and detecting the emitted light by a photoelectric read-out means, the radiation image read-out method comprising the steps of
i) determining the decrease with time of the amount of light emitted by said stimulable phosphor sheet having a predetermined level of radiation energy stored thereon when said stimulable phosphor sheet is exposed to a predetermined amount of stimulating rays, and
ii) compensating for the decrease with time of said amount of emitted light, which arises within read-out time for said radiation image, by calculating a compensation coefficient as a function of time based on said decrease with time for selected portions of said stimulable phosphor sheet exposed to stimulating rays, and multiplying a signal proportional to the light emitted by each selected portion of the stimulable phosphor sheet upon exposure to stimulating rays by the compensation coefficient for the respective selected portion of the stimulable phosphor sheet.

3. The method of claim 2 wherein said method comprises the steps of
generation of said stimulating light,
driving said stimulating rays to effect scanning said sheet,
receiving a photosignal generated by said emitted light from said sheet and converting said photosignal into an electric signal,
processing said electric signal, and
rectifying said electric signal.

4. The method of claim 3 wherein said compensating comprises intensity control of said stimulating light generation.

5. The method of claim 4 wherein said generation is achieved by a laser driver, and said intensity control is carried out by regulating an output of said laser driver.

6. The method of claim 3 wherein said compensating comprises scanning speed control of said stimulating rays.

7. The method of claim 6 wherein said driving is carried out by a deflector driver, and said scanning speed control is carried out by regulating said deflector driver.

8. The method of claim 3 wherein said compensating comprises gain control in a photoelectric conversion.

9. The method of claim 8, wherein a photomultiplier is utilized as a means for receiving and converting a photo signal, and said gain control in the photoelectric conversion is carried out by regulating the power source of said photomultiplier.

10. The method of claim 3 wherein said compensating comprises controlling a factor in said electric signal processing.

11. The method of claim 10 wherein said electric signal processing signal comprises a current voltage converting amplifier, a log converter, a sample holder an A/D converter and a CPU.

12. The method of claim 11 wherein said factor control during said electric signal processing is achieved by regulating an amplification gain in said current voltage converting amplifier.

13. The method of claim 11 wherein said factor control during said electric signal processing is achieved by regulating a conversion gain in said log converter and regulating an internal gain in said sample holder.

14. The method of claim 11 wherein said factor control during said electric signal processing is achieved by regulating a dynamic range in said A/D converter and regulating an input signal in the calculation factor of said CPU.

15. The method of claim 2 wherein said compensating is carried out based on the time period from said imagewise exposure to the commencement of reading.

16. The method of claim 15, wherein said compensating is carried out based on the information of light decay characteristics of said sheet determined prior to the compensating.

17. The method of claim 15, wherein said time is counted automatically in connection with exposing and reading operation.

18. The method of claim 15, wherein said sheet comprises a timer unit.

19. The method of claim 15, wherein said compensating is carried out based on the combination of the time period from said imagewise exposure to the commencement of reading and on the reading of the stimulable emission emitted from a predetermined portion of said sheet to which a predetermined quantity of exposure is given simultaneously with said imagewise exposure.

20. The method of claim 19, wherein said time is counted automatically in connection with the exposing and reading operation.

21. The method of claim 2, wherein said compensating is carried out based on the reading of the stimulable emission emitted from a predetermined portion of said sheet to which a predetermined quantity of exposure is given simultaneously with said imagewise exposure.

22. The method of claim 21, wherein said predetermined portion is provided adjacent to an imagewise area of said panel.

23. The method of claim 2, wherein said image-wise exposure is by X-ray.

24. The method of claim 2, wherein said stimulating rays are from 500 nm to 2000 nm in wavelength.

25. The method of claim 2, wherein said stimulable phosphor is alkali halide phosphor represented by the following formula:

$$M^{I}X \cdot aM^{II}X_2' \cdot bM^{III}X_3'' : cA$$

wherein $M^I$ represents at least one of alkaline metal selected from the group consisting of Li, Na, K, Rb and Cs; $M^{II}$ represents at least one divalent metal selected from the group consisting of Be, Mg, Ca, Sr, Ba, Zn, Cd, Cu and Ni; $M^{III}$ represents at least one trivalent metal selected from the group consisting of Sc, Y, La, Ce, Pr, Nd, Pm, Sm. Eu, Gd, Tb, Dy, Ho, Er, Tm, Yb, Lu, Al, Ga and In; X, X' and X" independently represent at least one halogen atom selected from the group consisting of F, Cl, I and Br; A represents at least one metal selected from the group consisting of Eu, Tb, Ce, Tm, Dy, Pr, Ho, Nd, Yb, Er, Gd, Lu, Sm, Y, Tl, Na, Ag, Cu and Mg; a, b and c are numerals in the range of $0 \leq a < 0.5$, $0 \leq b < 0.5$ and $0 < c \leq 0.2$, respectively.

26. The method of claim 2 wherein said decrease with time is a predetermined relationship inputted into a memory, and said compensation coefficient is calculated based on said relationship.

* * * * *